UNITED STATES PATENT OFFICE.

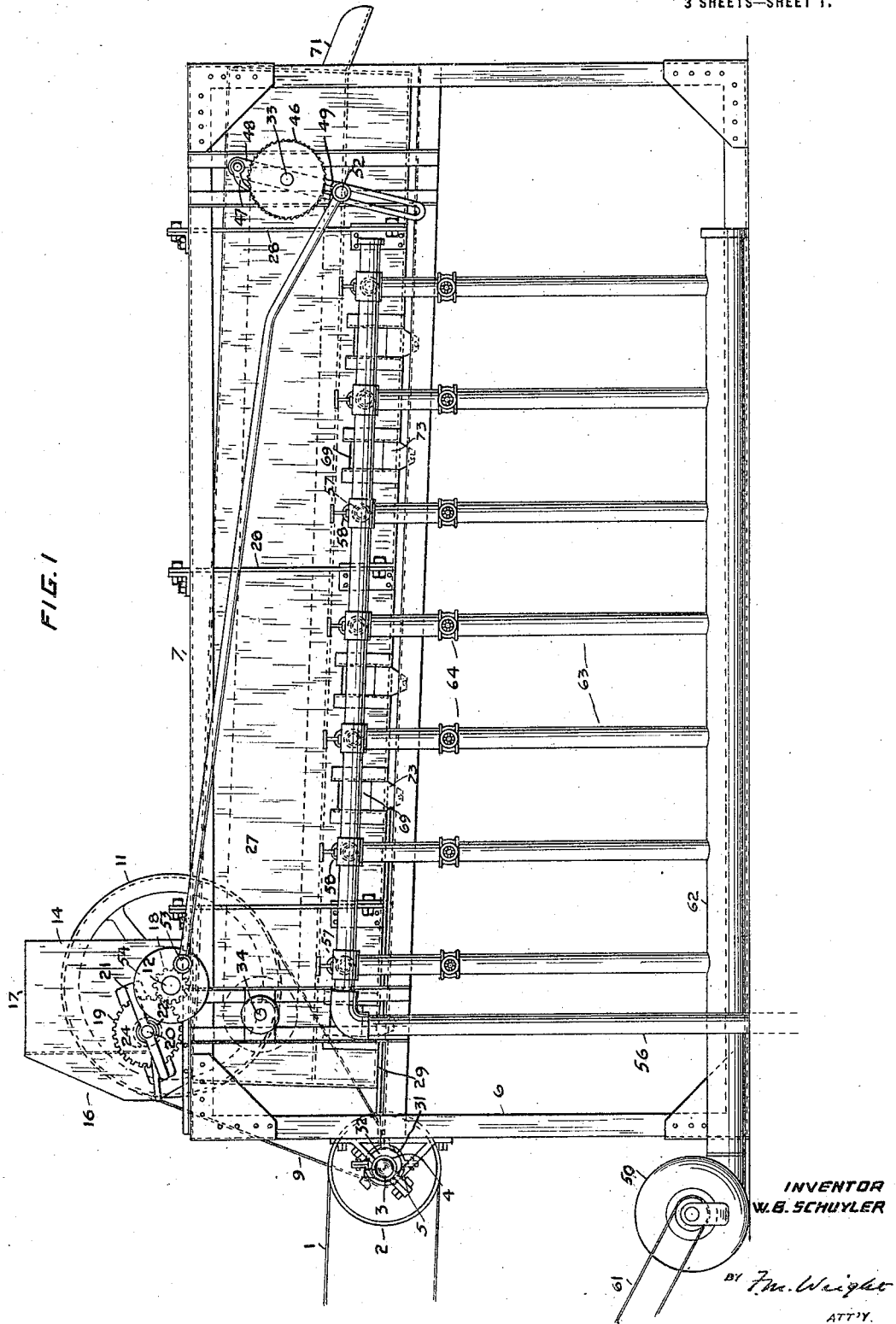

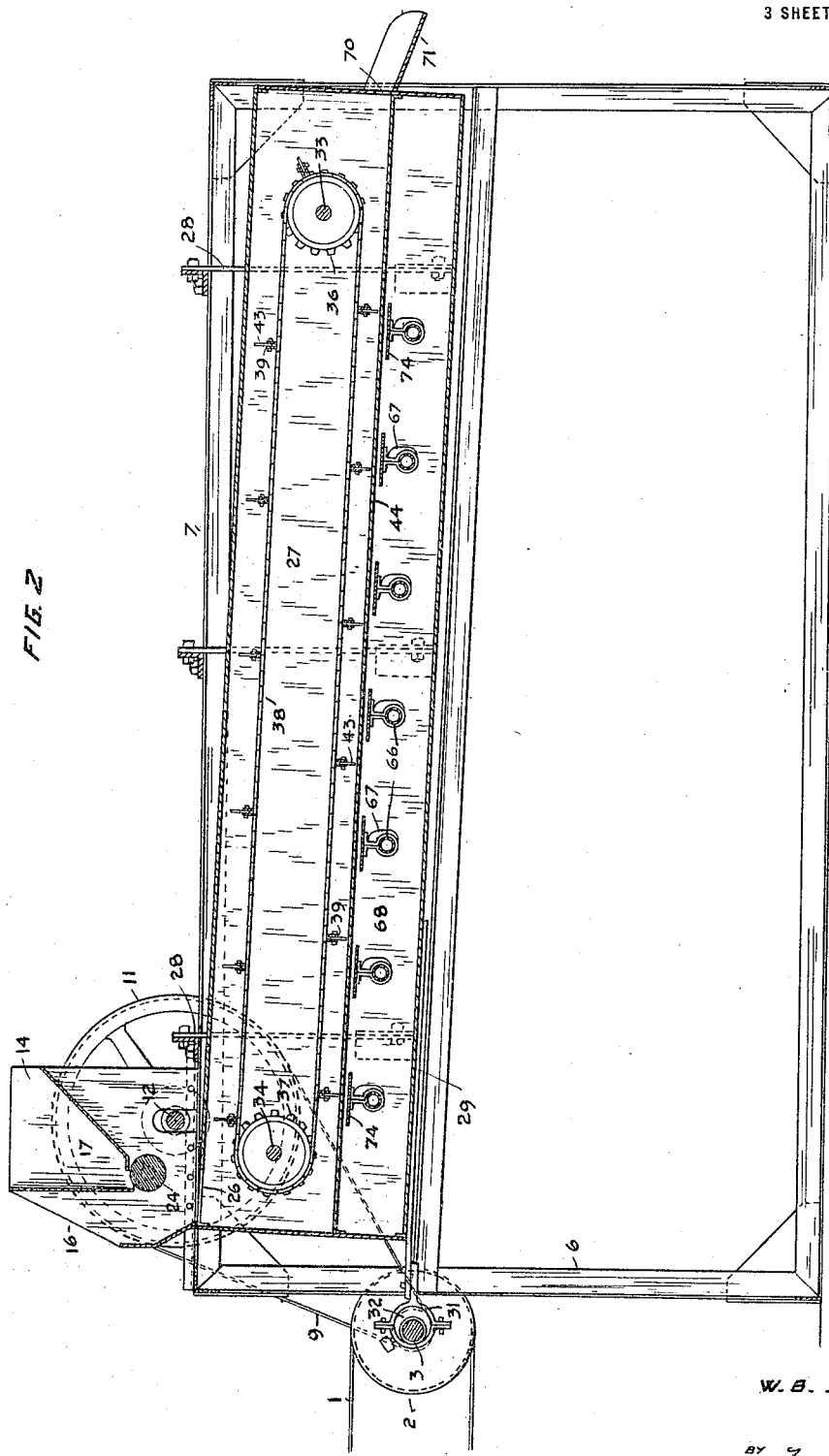

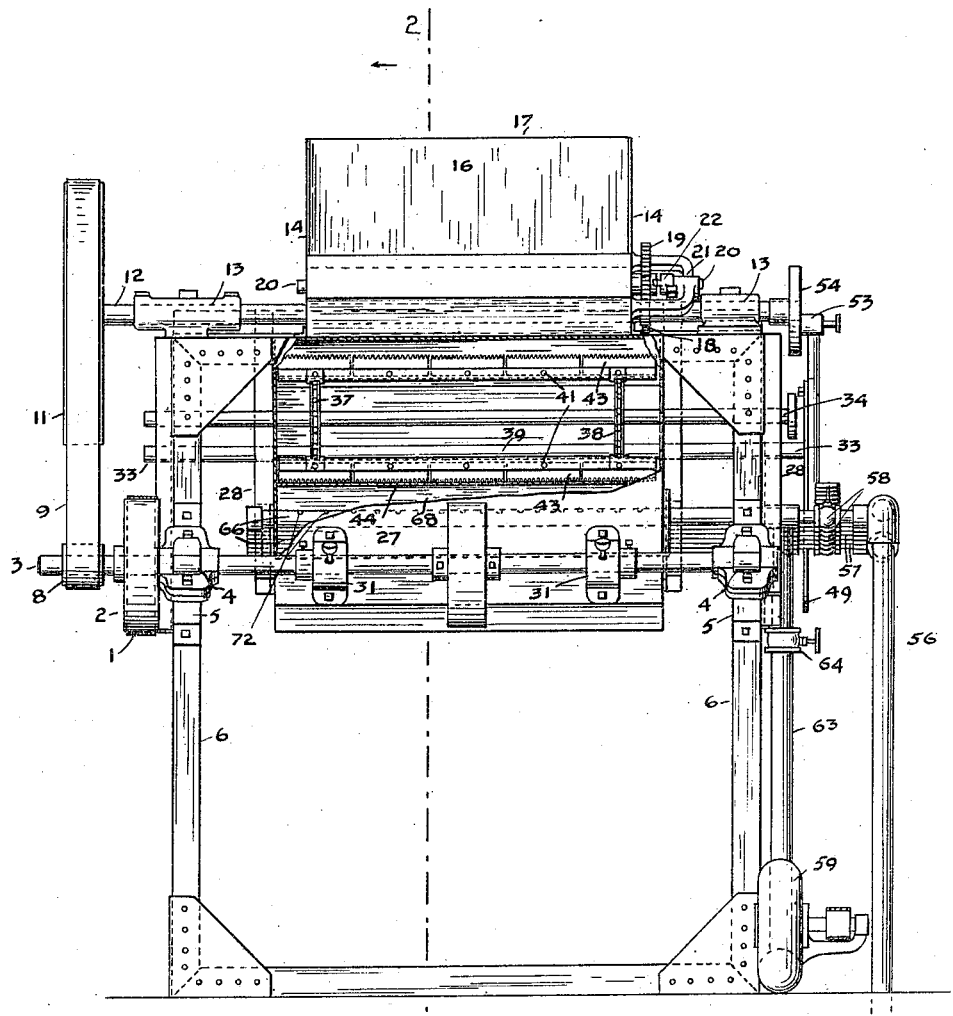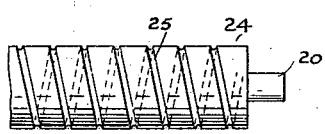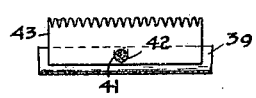

WILLIAM B. SCHUYLER, OF SAN FRANCISCO, CALIFORNIA.

RICE-POPPING MACHINE.

1,237,708.

Specification of Letters Patent. Patented Aug. 21, 1917.

Application filed May 14, 1917. Serial No. 168,392.

*To all whom it may concern:*

Be it known that I, WILLIAM B. SCHUYLER, a citizen of the United States, residing at San Francisco, in the county of San Francisco and State of California, have invented new and useful Improvements in Rice-Popping Machines, of which the following is a specification.

The present invention relates to a rice popping machine, the object of the invention being to provide a machine of this character by which rice can be popped uniformly in large quantities.

In the accompanying drawing, Figure 1 is a side view of the machine; Fig. 2 is a vertical longitudinal section thereof on the line 2—2 of Fig. 3; Fig. 3 is a broken end view thereof; Fig. 4 is a roller for distributing uniformly the grains of rice as they are fed to the popping machine; Fig. 5 is a comb section for advancing grains of rice over a heated floor.

Referring to the drawing, 1 indicates a belt driven by any suitable motor, not here shown, which travels around a pulley 2 on a shaft 3 mounted in bearings 4 in brackets 5 in the rear uprights 6 of a frame 7. Said shaft carries a pulley 8 around which travels a belt 9 which also travels around a pulley 11 on a shaft 12, rotating in bearings 13 on the top of said frame 7. Said shaft 12 extends through the sides 14 of a hopper frame 16 supported upon the frame 7 and supporting a hopper 17 into which the rice to be popped is supplied. On said shaft 12 is secured a pinion 18 which meshes with a gear wheel 19 loose on a shaft 20 having one bearing in a wall of the hopper frame 16, and the other in a bracket 21 extending from the other wall of the hopper frame. 22 indicates a clutch member slidable on, but rotatable with the shaft 20, and which can be moved into operative connection with a companion clutch member secured to the gear wheel 19 to cause the shaft 20 to be rotated by said gear wheel. Said shaft 20 carries a roller 24 located immediately beneath the discharge opening of the hopper, said roller 24 having a helical groove 25, by which the grains of rice are fed from the hopper when the shaft 20 rotates. Said grains drop through a hole 26 in the top of a slightly inclined popping chamber 27, supported by hangers 28 suspended from the frame 7. The bottom of said chamber 27 is secured to arms 29 attached at one end to rings 31 around eccentrics 32 of the shaft 3. With the rotation of said shaft therefore the popping chamber receives a short reciprocatory motion. Having bearings in the walls of said popping chamber are shafts 33, 34, which carry front and rear sprocket wheels 36, 37, around which travel sprocket chains 38 having secured thereto carriers 39 U-shaped in cross section, the sides of said U-shaped carriers being connected by pins 41 which extend through holes 42 in combs 43. These combs depend from the carriers carried by the lower portions of the chains in such a manner as to scrape along the bottom 44 of the popping chamber. At the same time the holes 42 are sufficiently larger than the pins 41 to permit the combs to have freedom of movement either vertically or horizontally.

Said chains are advanced by means of a ratchet wheel 46 secured to the forward shaft 33, which ratchet wheel is advanced by means of a pawl 47 pivotally secured at the end of an arm 48 of a lever rocking on the forward shaft 33, the other arm 49 of which is slotted. In the slot can be adjustably secured a pin 52 extending from the front end of a link, the rear end of which is attached to a wrist pin 53 upon a disk 54 carried by the shaft 12. By varying the position of the pin 52 in the slot, the rate of advance of said chains, and of the cereal, can be varied as desired to meet the varying conditions of the grain, as regards moisture and the like.

56 indicates a gas pipe having branch pipes 57 connected thereto and controlled by valves 58, and 59 indicates a blower rotated by a belt 61 driven from any suitable source of power, which blower forces air into a conduit 62 from which lead upright conduits 63, controlled by valves 64. Said conduits 63 and the several branch pipes 57 are connected respectively with burner pipes 66, which extend through rectangular holes 69 in the nearer side wall of a heating chamber 68, and also through holes 67 in its farther wall. The holes in both walls are sufficiently larger than the pipes 66 to allow the heating chamber to reciprocate, and the holes 69 in the nearer wall are considerably larger and more or less closed by slidable shutters 73 to vary the temperature of the heating chamber. The burner pipes 66 have apertures 72 to permit the mixture of air and gas to escape, and the flames from said mixture, being ignited at the said burner holes, are spread by baffle plates 74 extending transversely across the heating chamber immediately beneath the bottom of the popping chamber, and impart heat uniformly to said bottom. The rice that has been popped is discharged through a hole 70 in the lower end of the popping chamber and falls down a chute 71.

I claim:

1. In a cereal popping machine, the combination of a popping chamber, a heating chamber below the popping chamber, an endless belt in the popping chamber, means extending from said belt and adapted to contact with the bottom of the popping chamber to advance grains of cereal thereon, and means actuated from a common source of power for advancing said endless belt, and for reciprocating the popping chamber.

2. In a cereal popping machine, the combination of a popping chamber, a heating chamber below the popping chamber, a hopper for the cereal to be popped, a roller for feeding the grains of the cereal from said hopper into the popping chamber, an endless belt in the popping chamber, means extending from said belt and adapted to contact with the bottom of the popping chamber to advance grains of cereal thereon, and means actuated from a common source of power for rotating the feeding roller, advancing the endless belt and reciprocating the popping chamber.

3. In a cereal popping machine, the combination of an inclined popping chamber, a heating chamber below the popping chamber, an endless belt in the popping chamber, combs loosely attached to the said belt, and adapted to contact with the bottom of the popping chamber to advance grains of cereal thereon, and means actuated from a common source of power for advancing said endless belt, and for reciprocating the popping chamber.

4. In a cereal popping machine, the combination of a popping chamber, a heating chamber below the popping chamber and having openings communicating with the atmosphere, means for varying the size of said openings, an endless belt in the popping chamber, means extending from said belt and adapted to contact with the bottom of the popping chamber to advance grains of a cereal thereon, and means actuated from a common source of power for advancing said endless belt, and for reciprocating the popping chamber.

5. In a cereal popping machine, the combination of a popping chamber, a heating chamber below the popping chamber, an endless belt in the popping chamber, means extending from said belt and adapted to contact with the bottom of the popping chamber to advance grains of a cereal thereon, means actuated from a common source of power for advancing said endless belt, and for reciprocating the popping chamber, and means for varying the rate of said advance.

WM. B. SCHUYLER.

Copies of this patent may be obtained for five cents each, by addressing the "Commissioner of Patents, Washington, D. C."